May 6, 1941.  W. W. GAMBLE  2,240,694
EQUALIZING RING FOR CORRUGATED TYPE EXPANSION JOINTS
Filed June 28, 1939

Walter W. Gamble Inventor
By J. C. Small Attorney

UNITED STATES PATENT OFFICE 2,240,694

EQUALIZING RING FOR CORRUGATED TYPE EXPANSION JOINTS

Walter W. Gamble, Elizabeth, N. J., assignor to Standard Oil Development Company, a corporation of Delaware Application June 28, 1939, Serial No. 281,643

5 Claims. (Cl. 285—90)

The present invention relates to the structure of an expansion joint, and more particularly it relates to an expansion joint in which the union between the adjoining ends of two conduits is accomplished by means of a flexible, corrugated tube of metal or the like.

It is an object of the invention to provide a joint in which the tubular member is not only protected against injury by abrasion or otherwise, but also a joint in which rupture of the sleeve member, for whatever reason, does not result in the sudden release of the material being conducted therethrough.

This and other objects of the invention may be fully understood from the following description when it is read in conjunction with the accompanying drawing, in which.

Figure 1:
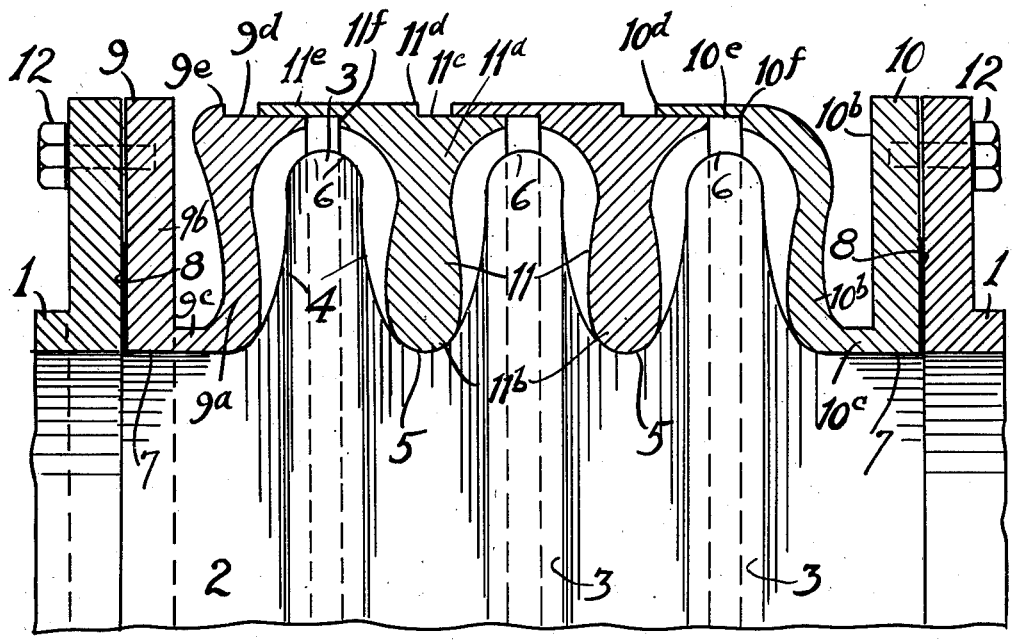
Fig. 1 is a longitudinal section of the structure, partly broken away.

In the structure represented by the drawing, the numeral 1 designates the adjoining ends of two conduit portions, between which an expansion joint is to be formed. A corrugated tubular member 2 is disposed between the conduit portions. This member, as shown, is of generally conventional type, the sidewalls 4 of each corrugation 3 being in the form of curved surfaces of lesser curvature than the concave bottom portions 5, and the convex top portions 6 of the corrugations. In the form shown, the concave hollows and convex arches of the corrugations are arcs of a circle having a relatively small radius of curvature, while by comparison the curved surfaces of the sidewalls have a relatively large radius of curvature. The end portions 7 of the member 2 are tubular, without corrugations, and are provided with flanges 8 for abutment against the conduit ends 1.

For the protection of such a corrugated expansion joint, according to the present invention, a sectional sleeve is provided which is composed of retainer ring end members 9 and 10 respectively, and such number of sleeve ring sections 11 as may be required by the length of the tubular expansion member 2. By virtue of the arrangement and inter-relationship of the various members constituting the protective sleeve as shown in the drawing, the sleeve also provides a covering for the expansion member which will impede the escape of fluid from a leak or sudden rupture of the tubular member 2.

The protective sleeve composed of the ring members 9 and 10 with sleeve sections 11 has a substantially smooth outer contour, but the inner contour conforms substantially to that of the corrugated member 2. The ring members 9 and 10 engage the end portions 7 of the tubular member 2, and also engage the flanges 8 in fluid-tight relation with the conduit ends 1, the assembly being maintained by means such as bolts 12.

The ring members 9 and 10 may be solid, or they may be formed in the manner illustrated, with the portions 9a or 10a spaced from and joined to the portions 9b and 10b by means of the portions 9c and 10c. When formed in the manner shown, the ring members provide for some degree of resiliency in the sleeve assembly when in a fully collapsed position.

The rim of the ring member 9, or as shown, of the portion 9a, is formed or machined so as to provide a circumferentially recessed external bearing surface 9d terminating in a shoulder 9e. The rim of the member 10 or of the portion 10a, has an angularly extended lip portion 10d on the inner surface of which is formed or machined, a recessed, internal bearing surface 10e, terminating in a shoulder 10f. Together with the outer bearing surface of the ring 9 engaging the inner bearing surface of the ring 10, the two ring members would provide an arched sinuous walled compartment adapted to receive a single corrugation such as designated by the numeral 3 in Fig. 1. The sleeve ring sections 11 combine both the outer recessed rim surface of the ring member 9 and the inner recessed lip of the ring member in such manner as to provide the required intermediate sections between the normally spaced ring members 9 and 10.

Figure 2:
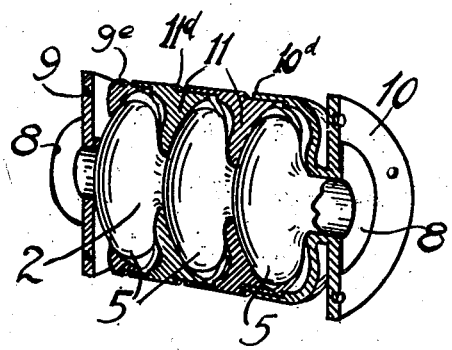
Fig. 2 is a perspective view of a portion of the structure, with parts broken away.

As indicated in Fig. 1, each ring section 11 includes an annular rim portion 11a, and an inwardly extending annular flange 11b, the surfaces of which flange have a concave-convex curvature resembling that of the corrugations 3. The outer surface of the rim portion is formed or machined to provide a recessed bearing surface 11c having a shoulder 11d. The opposite edge of the rim portion 11a is extended as a lip 11e, the inner surface of which is formed or machined to provide a recessed internal bearing surface terminating in a shoulder 11f. Each ring 11 is preferably formed in two parts which may be bolted together as shown in Fig. 2, or otherwise joined as by welding.

Figure 3:
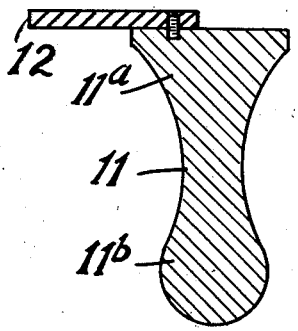
Fig. 3 is a longitudinal section of an alternate form of structure, partly broken away.

If desired, the ring sections 11 may be formed in the manner shown in Fig. 3. According to this arrangement, the rim portion 11a is formed without the lip 11e or the recessed bearing surface and shoulder 11c as shown in Figs. 1 and 2. Instead an annular plate 12 is eccentrically secured about the rim to provide for the desired conformation and operating surfaces.

Although the invention has been described in connection with a specific form of corrugated expansion joint, it should be obvious that the principles involved in the construction and arrangement of the protective sleeve are equally applicable to other joints of substantially similar nature. The construction described permits of close fits between bearing surfaces such as will prevent substantial leakage through the sleeve in the event of failure of the inner corrugated expansion tube. This sleeved joint, according to the invention, is particularly suited for use in connection with conduits used to carry hot oil, water, steam, or volatile and inflammable materials, where serious safety hazards may exist due to the possibility of a ruptured joint suddenly releasing large quantities of hot or inflammable fluids.

It is not intended that the invention shall in any way be limited by any specific disclosures set forth herein for the purpose of illustration, but only by the accompanying claims.

I claim:

1. An expansion joint comprising a flexible corrugated tube, end fittings at the outer side respectively of the endmost corrugations, intermediate ring members in the depressions between successive corrugations, a rim portion on one of said end fittings having a laterally extending, peripheral flange, a rim portion on said other end fitting having a peripherally disposed shouldered bearing surface, a rim portion on each ring member having a laterally offset peripheral flange, and a peripherally disposed shouldered bearing surface adjacent thereto, said end fittings and ring members being disposed for substantially fluid-tight, telescopic relation between the flange and shouldered rim portions, and cooperating to prevent distortion of the joint, and to limit shortening movement thereof.

2. In an expansion joint of the class described, an equalizer ring comprising an annular tongue extending radially into the space between corrugations, a rim portion integral with the tongue, extending laterally above said corrugations, and a laterally offset peripheral flange integral with said rim providing for a telescopic, substantially fluid-tight relation between adjoining rings.

3. An expansion joint of the character described, comprising an annularly corrugated tube of a flexible material, a substantially fluid-tight extensible sleeve member enclosing said tube, the sleeve consisting of a plurality of overlapping sleeve sections; and an annular flange member integral with each sleeve section, each of said flange members extending into an annular trough between tube corrugations.

4. An expansion joint of the character described, comprising an annularly corrugated tube of a flexible material, means for retaining said tube as a fluid-tight expansion joint between two conduit sections; and a substantially fluid-tight, extensible sleeve member enclosing said tube, consisting of a plurality of annular separator elements individually disposed in the depressions between the tube corrugations, and a flanged rim portion integral with each element extending beyond the corrugations into lapped slidable relation to the rim portion of an adjoining element, and with said retaining means.

5. In an expansion joint of the character described, including a pair of conduit end portions, disposed in spaced, coaxial relation, an expansion member coaxially between said portions, communicating therewith, comprising an annularly corrugated tube of a flexible material; and a protective, tube-equalizer sleeve consisting of a substantially annular retainer member at each end of said tube, joining the tube ends in fluid-tight relation to the conduit portions, and a plurality of sleeve elements intermediate said retainer members, each having an annular tongue extending into the depression between two tube corrugations, and a continuous flanged rim portion on each element in spaced relation to said corrugations disposed for substantially fluid-tight telescopic inter-relation with adjoining elements and said retainer members.

WALTER W. GAMBLE.